United States Patent
Chalmers et al.

(10) Patent No.: US 10,326,815 B2
(45) Date of Patent: Jun. 18, 2019

(54) TECHNIQUES FOR SCALABLY SHARING VIDEO THROUGH A STREAMING SERVER

(71) Applicant: GetGo, Inc., Fort Lauderdale, FL (US)

(72) Inventors: Robert Chalmers, Longview, WA (US); Sascha Kuemmel, Langebrueck (DE); Eugen Wige, Kronach (DE); Paul Elsner, Dresden (DE); Steffen Schulze, Dresden (DE)

(73) Assignee: LogMeIn, Inc., Boston, MA (US)

( * ) Notice: Subject to any disclaimer, the term of this patent is extended or adjusted under 35 U.S.C. 154(b) by 317 days.

(21) Appl. No.: 15/385,367

(22) Filed: Dec. 20, 2016

(65) Prior Publication Data

US 2018/0176279 A1 Jun. 21, 2018

(51) Int. Cl.
*H04L 29/06* (2006.01)
*H04L 12/24* (2006.01)

(52) U.S. Cl.
CPC .......... *H04L 65/607* (2013.01); *H04L 65/602* (2013.01); *H04L 65/80* (2013.01)

(58) Field of Classification Search
CPC ... H04L 41/0896; H04L 65/80; H04L 65/601; H04L 65/602; H04L 65/607
See application file for complete search history.

(56) References Cited

U.S. PATENT DOCUMENTS

| | | | |
|---|---|---|---|
| 7,680,885 B2 | 3/2010 | Schauser et al. | |
| 7,827,139 B2 | 11/2010 | Schauser et al. | |
| 9,510,004 B2 * | 11/2016 | Chang | H04N 19/124 |
| 9,532,057 B2 | 12/2016 | Van Der Auwera et al. | |
| 9,712,833 B2 * | 7/2017 | Wang | H04N 19/70 |
| 9,813,721 B2 | 11/2017 | Schulze | |
| 2007/0110150 A1 * | 5/2007 | Wang | H04N 21/23432 375/240.1 |
| 2007/0160305 A1 * | 7/2007 | Demos | H04N 19/13 382/244 |
| 2009/0003439 A1 * | 1/2009 | Wang | H04N 19/70 375/240.08 |
| 2013/0039278 A1 * | 2/2013 | Bouazizi | H04L 65/4076 370/328 |
| 2013/0208792 A1 * | 8/2013 | He | H04N 19/105 375/240.12 |

(Continued)

FOREIGN PATENT DOCUMENTS

CN 107197267 A * 9/2017

OTHER PUBLICATIONS

Steffen Schulze, et al.; "Synchronizing Video Signals Using Cached Key Frames," U.S. Appl. No. 15/378,984, filed Dec. 14, 2016.

*Primary Examiner* — Kostas J Katsikis
(74) *Attorney, Agent, or Firm* — BainwoodHuang

(57) ABSTRACT

Techniques are provided for a source computer to generate an encoded video stream having layered sub-streams with differing bitrates while allowing a streaming server to intelligently distribute the appropriate sub-streams to recipients based on their available bandwidth. This may be accomplished by having the source computer generate and send metadata along with the encoded stream to allow the streaming server to detect which data packets belong to each sub-stream. The streaming server is then able to selectively send consistent video sub-streams at appropriate bitrates to each recipient.

28 Claims, 6 Drawing Sheets

(56) References Cited

U.S. PATENT DOCUMENTS

| | | | |
|---|---|---|---|
| 2014/0192893 A1* | 7/2014 | Sullivan | H04N 21/23424 |
| | | | 375/240.25 |
| 2014/0369405 A1* | 12/2014 | Chang | H04N 19/124 |
| | | | 375/240.03 |
| 2015/0373075 A1* | 12/2015 | Perlman | H04L 65/608 |
| | | | 709/217 |
| 2016/0050436 A1* | 2/2016 | Liu | H04N 19/597 |
| | | | 375/240.24 |
| 2016/0198158 A1 | 7/2016 | Wige et al. | |
| 2018/0124414 A1* | 5/2018 | Van Leuven | H04N 19/124 |

* cited by examiner

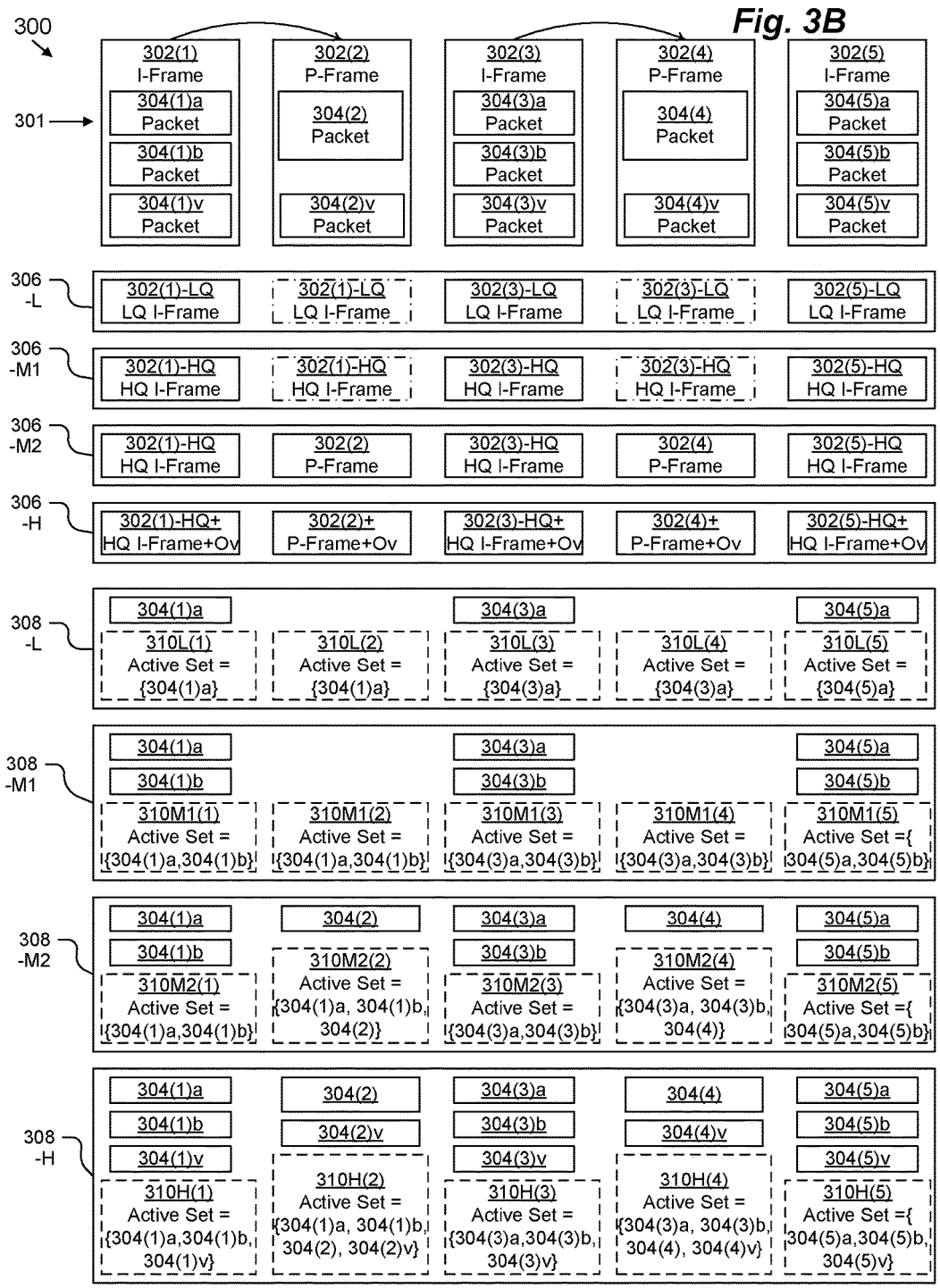

TECHNIQUES FOR SCALABLY SHARING VIDEO THROUGH A STREAMING SERVER

BACKGROUND

Users may share their desktop screens with one or more recipient computers using screen sharing. In order to alleviate the burden on the source computer, a separate streaming server may be utilized to distribute the shared screen to the recipient computers. This screen sharing may be accomplished by the source computer sending an updated screen shot to the streaming server whenever the screen changes. In some embodiments, the screen may be divided into tiles, allowing only the individual tile or tiles that have changed to be resent. The source computer may use image-based compression to reduce the size of each screen update or tile to save bandwidth. The streaming server may compensate for the differing bandwidths available to the various recipient computers by skipping one or more updated screen shots from being sent to one or more of the recipient computers.

SUMMARY

The above-described approach works well for screens that have slowly-changing content or content that changes in only small portions of the screen at a time. Unfortunately, it does not work as well when the source screen changes rapidly. When many changes are repeatedly made to the screen, updated screen shots may need to be sent at a high frame rate (e.g., 30 or more frames per second). When each of these updated screen shots includes changes to several tiles at once, the screen sharing can end up consuming as much bandwidth as high framerate video, which can be bandwidth-intensive.

It would be desirable to utilize modern high compression video codecs (e.g., MPEG, MPEG-2, MPEG-4, H.264, H.265, etc.), which are able to take advantage of redundancy between frames (as well as redundancy within frames) to greatly increase compression ratios, thereby requiring much lower average bandwidth. However, the frames produced by most modern codecs can have coding dependencies on previous frames. Thus, the use of such video codecs can make it difficult to accommodate recipients having different available bandwidths by dropping frames, as the dropped frames may be referenced by later frames, resulting in frames that are not renderable by recipients, wasted bandwidth, and jerky video.

Although it is possible to have the streaming server transcode the video received from the source computer into several sub-streams having differing bitrates for the various recipient computers with differing respective bandwidths, this approach suffers from the inefficiency of requiring the video to be encoded twice, which reduces quality, wastes computing resources, and increases latency. It also unnecessarily involves the streaming server in the video creation process, which is problematic in high-security applications in which end-to-end encryption is needed.

Thus, it would be desirable for a source computer to generate an encoded video stream having layered sub-streams with differing bitrates while allowing the streaming server to intelligently distribute the appropriate sub-streams to recipients based on their available bandwidth. This may be accomplished by having the source computer generate and send metadata along with the encoded stream to allow the streaming server to detect which data packets belong to each sub-stream. The streaming server is then able to selectively send consistent video sub-streams at appropriate bitrates to each recipient. Advantageously, these techniques improve average bandwidth over the conventional image-based approach by using stronger compression, while avoiding excessive jerkiness at low-bandwidth receivers even as frames are dropped, unlike using a modern video codec on the streaming server. In addition, quality is maintained and latency is reduced in comparison to transcoding approaches.

One embodiment is directed to a method, performed by a computing device. The method includes (a) generating an encoded video stream having a plurality of ordered layers of increasing quality, a lowest layer including video content of key frames of the video stream and excluding at least one delta frame of the video stream, a highest layer including video content of the key frames and all delta frames of the video stream, each layer of quality but the lowest layer including video content of at least one lower quality layer, each layer of quality having a respective target data rate larger than target data rates of all lower quality layers, wherein (1) each delta frame includes difference data which, in combination with video content of at least one previous frame of the video stream, reconstructs that delta frame and (2) each key frame contains a complete picture encoded independently of other frames, (b) generating metadata for each layer of the video stream, the metadata for each layer identifying particular video content to be used to reconstruct video at that layer of quality, and (c) sending the video content of the encoded video stream and the metadata for each layer of the video stream to a streaming server for selective bandwidth-based distribution to receivers having differing network bandwidths. Other embodiments are directed to corresponding apparatuses, computer program products, and systems for performing similar methods.

Another embodiment is directed to a method, performed by a streaming server device. The method includes (A) receiving, from a source device over a network connection, an encoded video stream having a plurality of ordered layers of increasing quality, a lowest layer including video content of key frames of the video stream and excluding at least one delta frame of the video stream, a highest layer including video content of the key frames and all delta frames of the video stream, each layer of quality but the lowest layer including video content of at least one lower quality layer, each layer of quality having a respective target data rate larger than target data rates of all lower quality layers, wherein (1) each delta frame includes difference data which, in combination with video content of at least one previous frame of the video stream, reconstructs that delta frame and (2) each key frame contains a complete picture encoded independently of other frames, (B) receiving, from the source device over the network connection, metadata for each layer of the video stream, the metadata for each layer identifying particular video content to be used to reconstruct video at that layer of quality, (C) for each of a plurality of remote recipients having different available bandwidths, assigning a layer of quality to that remote recipient such that the target data rate of the assigned layer of quality is exceeded by the available bandwidth of that remote recipient, and (D) for each remote recipient, selectively sending to that remote recipient video content that is identified by the metadata for the layer of quality assigned to that remote recipient. Other embodiments are directed to corresponding apparatuses, computer program products, and systems for performing similar methods.

BRIEF DESCRIPTION OF THE DRAWINGS

The foregoing and other objects, features, and advantages will be apparent from the following description of particular embodiments of the present disclosure, as illustrated in the accompanying drawings in which like reference characters refer to the same parts throughout the different views. In the accompanying drawings.

FIGS. 3A and 3B are block diagrams depicting example data configurations according to techniques of various embodiments.

DETAILED DESCRIPTION

Embodiments of the invention will now be described. It is understood that such embodiments are provided by way of example to illustrate various features and principles of the invention, and that the invention hereof is broader than the specific example embodiments disclosed.

Improved techniques are provided to allow a source computer to generate an encoded video stream having layered sub-streams with differing bitrates while allowing the streaming server to intelligently distribute the appropriate sub-streams to recipients based on their available bandwidth. This may be accomplished by having the source computer generate and send metadata along with the encoded stream to allow the streaming server to detect which data packets belong to each sub-stream. The streaming server is then able to selectively send consistent video sub-streams at appropriate bitrates to each recipient.

Description of Environment and Apparatuses

Figure 1:
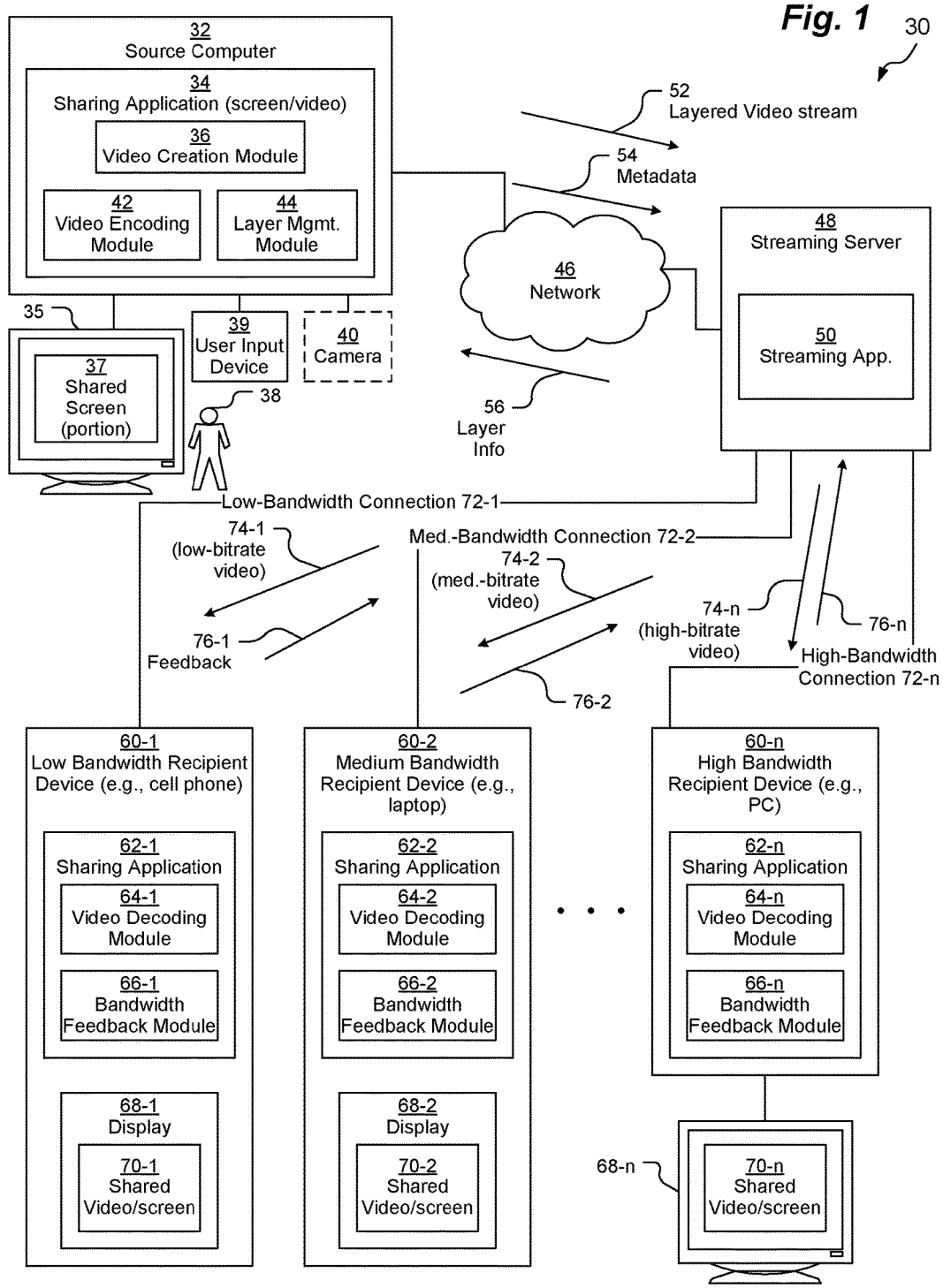
FIG. 1 is a block diagram depicting a logical view of an example system according to various embodiments.

FIG. 1 shows an example environment 30 in which embodiments of the improved techniques hereof can be practiced. Here, a source computer 32 runs a sharing application 34 that allows a shared screen portion 37 displayed on a display device 35 to a user 38 to be shared with a set of one or more recipient devices 60 (depicted as low bandwidth recipient device 60-1, medium bandwidth recipient device 60-2, . . . , high bandwidth recipient device 60-n) via a remote streaming server 48.

Source computer 32 may be any kind of computing device, such as, for example, a personal computer, a workstation, a server, an enterprise server, a laptop, a tablet, a smartphone, etc. Source computer 32 connects to a display device 35, one or more user input devices 39, and, in some embodiments, a camera 40. In some embodiments, one or more of the display device 35, user input devices 39, and camera 40 may be integrated within the source computer 32.

Display device 35 may be any kind of device capable of displaying images to user 38. Display device 35 may be, for example, a CRT, LCD, plasma, or LED monitor or embedded display screen. User input devices 39 allow user 38 to directly interact with the computing device 32. User input devices 39 may include, for example, a keyboard, keypad, mouse, trackpad, trackball, touch-sensitive screen, etc.

In some embodiments, a digital camera 40 produces a video signal of the surrounding environment, allowing the video signal to be seen on the display device 35 and/or recorded on the source computer 32. In one embodiment, digital camera 30 may be a WebCam intended to produce video of the user 38.

Source computer 32 runs an operating system (not depicted in FIG. 1), which provides a graphical user interface (GUI) (not depicted) on display device 35. Sharing application 34 runs on source computer 32 in order to allow either the entire GUI screen or a portion thereof 37 to be shared with remote recipient devices 60. Sharing application 34 may include a video creation module 36, a video encoding module 42, and a layer management module 44. Video creation module 36 creates a digital video signal to be shared. In some embodiments, video creation module 36 turns the shared screen portion 37 into a digital video signal as it varies over time. In another embodiment, video creation module 36 may instead create a video signal for sharing based on the output of camera 40. In some embodiments, the video output by camera 40 may be included as a part of the shared screen portion 37.

Video encoding module 42 creates a layered video stream 52 by encoding the digital video signal to be shared using an inter-frame video codec. Any type of inter-frame video codec may be used, such as, for example, MPEG, MPEG-2, MPEG-4, H.263, H.264, H.265, etc.), but typically not a purely intra-frame video codec such as MJPEG. The layering of the layered video stream 52 may either be implicit or explicit. An explicitly layered video stream is explicitly layered from the perspective of the codec. Thus, for example, H.264 Scalable Video Coding (SVC) explicitly creates several video sub-streams. Each sub-stream (except for one) builds upon the data included within a lower-layer sub-stream. On the other hand, an implicitly layered video stream is not intrinsically layered from the perspective of the codec. Thus, a simple MPEG encoder may produce I-frames, P-frames, and B-frames without explicitly layering streams. However, that single video stream may be implicitly divided into a low bandwidth video sub-stream having only the I-frames, a medium bandwidth video sub-stream having the I-frames as well as the P-frames, and a high bandwidth video sub-stream having all frames including the B-frames.

Regardless of whether layered video stream 52 is layered implicitly or explicitly, layered video stream 52 includes data packets (not depicted in FIG. 1) some of which are in a lowest layer, and some of which are in both the lowest layer and one or more higher layers. Typically, there are three to five layers (although there may be fewer or more), with each higher layer building upon the immediately lower layer.

Layer management module 44 creates metadata 54 that allows the various layers of the layered video stream 52 to be expressed. Thus, for example, given a layered video stream 52 having a lowest layer, an intermediate layer, and a highest layer, metadata 54 identifies which packets are only in the highest layer, which packets are in both the highest layer and the intermediate layer, and which packets are also in the lowest layer.

In operation, sharing application 34 sends the layered video stream 52 as well as the metadata 54 across a network 46 to streaming server 48. Streaming server 48 runs a streaming application 50, which receives the layered video stream 52 and the metadata 54 and sends video streams 74 (depicted as low-bitrate video stream 74-1, medium-bitrate video stream 74-2, . . . , and high-bitrate video stream 74-n) at various bitrates to recipient devices 60 by selectively applying data packets from the layered video stream 52 to the various video stream 74 with reference to the metadata 54. It should be understood that the streaming server 48 may not be able to decode the received video stream 52 for playback. Thus, although a codec used to encode the video is installed on the source computer 32 and a codec used to decode the video is installed on the recipient devices 60, there is no need for such a codec to be installed on the streaming server 48 because there is no need for the streaming server 48 to be able to playback or otherwise decode the contents of the video stream 52.

The network 46 may be any type of network or combination of networks, such as a local area network (LAN), a wide area network (WAN), the Internet, and/or some other type of network or combination of networks, for example. The source computer 32 may connect to the streaming server 48 using various technologies, such as Ethernet, Token Ring, or Wi-Fi, for example.

In some embodiments, the streaming server 48 may be provided within the source computer 32, but, typically the streaming server 48 is a separate device from the source computer 32, often at a remote location. In either case, sharing application 34 sends both the layered video stream 52 and the metadata 54 to the streaming application 50.

In a typical embodiment, a separate instance of the streaming application 50 runs on the streaming server for each source computer 32 that seeks to share its respective shared screen 37 with recipients 60. Thus, for example, Company A (not depicted) may have 100 employees, and, at a given time three sales employees are each giving a presentation to potential clients running recipient devices 60, while two management employees are each giving a presentation to their respective departments. Thus, each of those five employees (the three sales employees and the two management employees) are running their local computers as source computers 32, all of which may communicate with a single streaming server 48 operated by (or contracted to) Company A. In this example, streaming server 48 runs five instances of streaming application 50. The potential clients each run a respective recipient device 60. In addition, each employee within the departments having presentations also runs a respective recipient device 60. Each instance of streaming application 50 streams the shared screen 37 from one of the three sales employees and the two management employees to the appropriate recipients at a bitrate appropriate for the respective bandwidth available to each respective recipient device 60.

It should be understood that a company may run more than one streaming server 48. It should also be understood that several different companies or other entities (e.g., individuals, governments, etc.) may share one or more streaming servers 48.

In some embodiments, there may be a cascading set of streaming servers 48 in place of a single streaming server 48. Thus, a first streaming server 48 may receive the video stream 52 from the source computer and stream the video to some of the recipient devices 60 but also forward the video stream 52 (or possibly a sub-stream 74) to another streaming server 48, which then streams to other recipient devices 60, etc.

Streaming server 48 may be any kind of computing device, such as, for example, a server, an enterprise server, a personal computer, a workstation, a laptop, a tablet, a smartphone, etc. Typically, however, streaming server 48 is a server or an enterprise server. Streaming server 48 is configured to communicate with one or more source computers 32 over one or more networks 46. In addition, streaming server 48 is configured to communicate with recipient devices 60 over a set of network connections 72 (depicted as low-bandwidth connection 72-1, medium-bandwidth connection 72-2, . . . , high-bandwidth connection 72-*n*). It should be noted that one or more of these network connections 72 may be across network 46. It should also be noted that each network connection 72 may traverse one or more networks (e.g., the Internet, a cellular data network, a home network, etc.).

Often, for example, all network connections 72 go across the Internet, but low-bandwidth connection 72-1 has a final leg to recipient 60-1 (e.g., a cellular phone) over a cellular data network (e.g., 10 Mbps), while medium-bandwidth connection 72-2 has a final leg to recipient 60-2 (e.g., a laptop computer) over a wireless network (e.g., 54 Mbps), and high-bandwidth connection 72-*n* has a final leg to recipient 60-*n* (e.g., a desktop computer) over a wired Ethernet network (e.g., 1000 Mbps). The end-to-end bandwidth of each connection 72 actually depends on the lowest bandwidth leg. Thus, for example, even though high-bandwidth connection 72-*n* has a final leg with a bandwidth of 1000 Mbps, the end-to-end bandwidth may only be 150 Mbps because the Ethernet network connects to the Internet via an ISP's cable network having a 150 Mbps connection speed.

Each recipient device 60 may be any kind of computing device, such as, for example, a personal computer, a workstation, a laptop, a tablet, a smartphone, a server, an enterprise server, etc. Typically, however, a recipient device 60 is a personal computer, a workstation, a laptop, a tablet, or a smartphone. Each recipient device 60 is configured to communicate with the streaming server 48 over a respective connection 72, as described above. Each recipient device 60 runs a sharing application 62. The sharing application 62-*x* running on a recipient device 60-*x* includes a video decoding module 64-*x* as well as a bandwidth feedback module 66-*x*.

A display device 68 is either integrated within or attached to each recipient device 60. For example, in the case of a cellular phone, tablet, or laptop, the display device 68-1, 68-2 is typically integrated. On the other hand, in the case of a personal computer or workstation, the display device 68-*n* is typically external. Display device 68 may be any kind of device capable of displaying images to a user (not depicted) of its respective recipient device 60. Display device 68 may be, for example, a CRT, LCD, plasma, or LED monitor or display screen. Display device 68 displays a shared video or screen 70 based on the shared screen portion 37 from the source computer 32.

On any given recipient device 64-*x*, video decoding module 64-*x* operates to decode the video stream 74-*x* received by that recipient device 64-*x* and then display the decoded video on the display 68-*x* as shared video/screen 70-*x*. Bandwidth feedback module 66-*x* operates in parallel to provide feedback 76-2 to the streaming server 48 about the bitrate of the video stream 74-*x* sent to that recipient device 64-*x*. For example, if data packets of the video stream 74-*x* are received at the recipient device 64-*x* too late to be of use in decoding the video stream 74-*x* for proper display or if anticipated data packets of the video stream 74-*x* are never received (i.e., frames are skipped beyond the frames that were supposed to be skipped for that bitrate), then bandwidth feedback module 66-*x* may generate feedback 76-*x* indicating that the bitrate of the incoming video stream 74-*x* is too high. Conversely, if all data packets of the video stream 74-*x* are received at the recipient device 64-*x* in a timely fashion, most of them with time to spare, then bandwidth feedback module 66-*x* may generate feedback 76-*x* indicating that the bitrate of the incoming video stream 74-*x* is too low.

Streaming application 50 receives the feedback 76 from the various recipient devices 60. Streaming application 50 is then able to use this received feedback 76 to dynamically upgrade or downgrade the bitrate of the video stream 74 sent to each recipient device. Streaming application 50 is also able to use the received feedback 76 to generate modified layering information 56 to send back to the source computer 32, so that the source computer 32 can generate the layered video stream 52 with a more appropriate number of layers and with more appropriate target bitrates. For example, if the received feedback 76 indicates that two recipient devices 60 have actual bandwidths of 13 Mbps, one recipient device 60 has an actual bandwidth of 25 Mbps, one recipient device 60 has an actual bandwidth of 27 Mbps, and one recipient device 60 has an actual bandwidth of 50 Mbps, streaming application 50 may send back layering information indicating that three layers having respective target bitrates of 13 Mbps, 25 Mbps, and 50 Mbps should be used within the layered video stream 52 (although previously the layered video stream 52 might have inefficiently been using two layers with respective bitrates of 17 Mbps and 40 Mbps).

Figure 2:
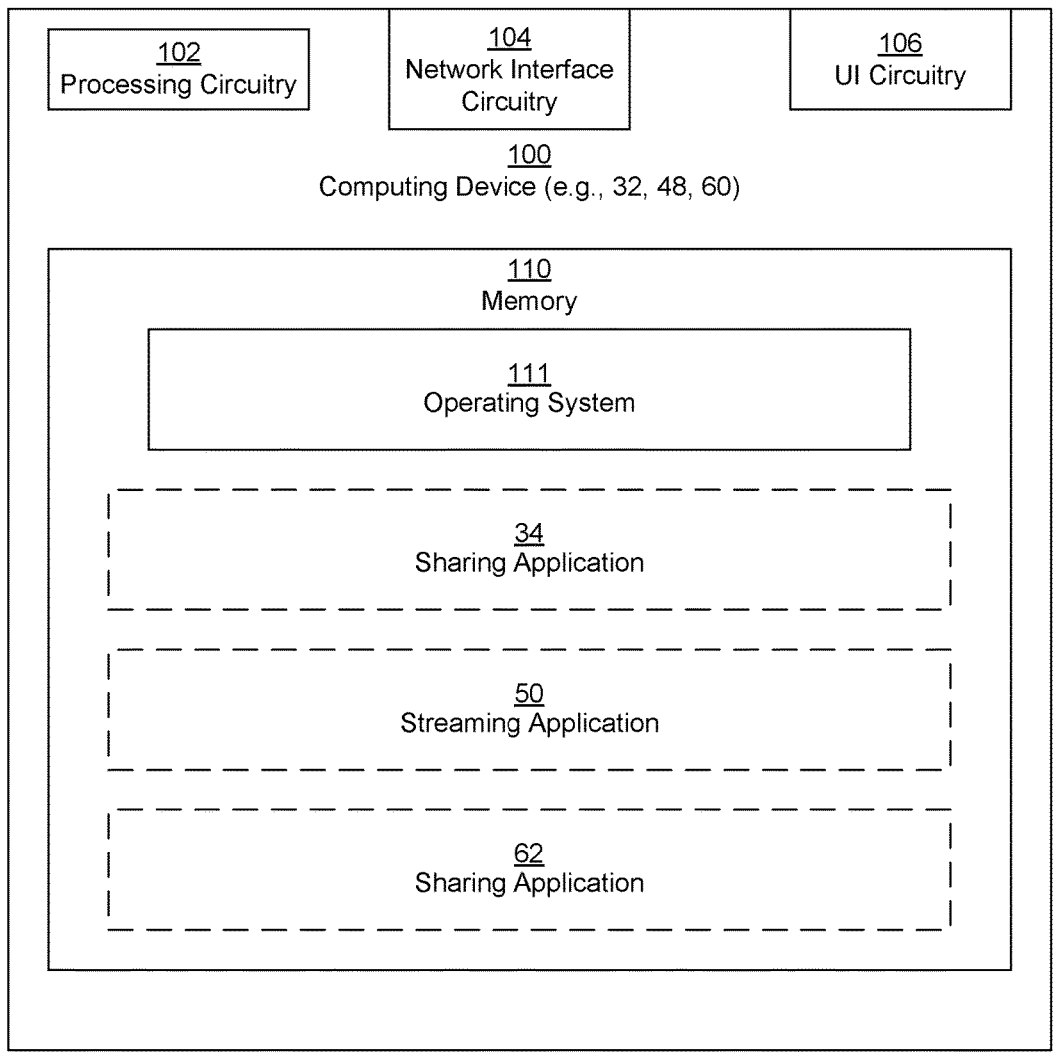
FIG. 2 is a block diagram depicting an example apparatus according to various embodiments.

FIG. 2 depicts an example computing device 100 which may be used as a source computer 32, streaming server 48, or recipient device 60. Computing device 100 includes processing circuitry 102, network interface circuitry 104, memory 110, and interconnection circuitry (not depicted). Computing device 100 may also include user interface (UI) circuitry 106.

Processing circuitry 102 may be any kind of processor or set of processors configured to perform operations, such as, for example, a microprocessor, a multi-core microprocessor, a digital signal processor, a system on a chip, a collection of electronic circuits, a similar kind of controller, or any combination of the above.

Network interface circuitry 104 may include one or more Ethernet cards, cellular modems, cable modems, DSL modems, Wireless Fidelity (Wi-Fi) wireless networking adapters, and other devices for connecting to a network (e.g., network 46 and/or any network that provides any of the connections 72), such as a LAN, WAN, cable system, DSL system, cellular data network, etc.

UI circuitry 106 may connect to one or more UI devices (e.g., user input devices 39, display devices 35, 68, camera 40, etc.), which allow a user (e.g., user 38) to directly interact with the computing device 100. UI circuitry 106 may include, for example, a graphics adapter for connecting to a display device (e.g., display devices 35, 68) and one or more communications buses. These communications buses may connect to, for example, a keyboard, mouse, trackpad, etc.

The memory 110 may include both volatile memory (e.g., random access memory, RAM), and non-volatile memory, such as one or more read-only memories (ROMs), disk drives, solid-state drives, and the like. At a minimum, memory 110 includes system memory, typically RAM. The processing circuitry 102 and the memory 110 together form control circuitry, which is constructed and arranged to carry out various methods and functions as described herein, e.g., alone or in coordination with similar control circuitry on another data storage system. Also, the memory 110 includes a variety of software constructs realized in the form of executable instructions. When the executable instructions are run by the processing circuitry 102, the processing circuitry 102 is caused to carry out the operations of the software constructs. Although certain software constructs are specifically shown and described, it should be understood that the memory 110 typically includes many other software constructs, which are not shown, such as various applications, processes, and daemons. Applications configured to run on processing circuitry 102 when stored in non-transitory form, either in the volatile portion or the non-volatile portion of memory 110 or both, form a computer program product. The processing circuitry 102 running one or more of these applications thus forms a specialized circuit constructed and arranged to carry out the various processes described herein.

As shown in FIG. 2, the memory 110 typically also stores an operating system 111 that runs on processing circuitry 102. Memory 110 also stores one or more of sharing application 34, streaming application 50, and sharing application 62.

Description of Data Structures

Figure 3A:
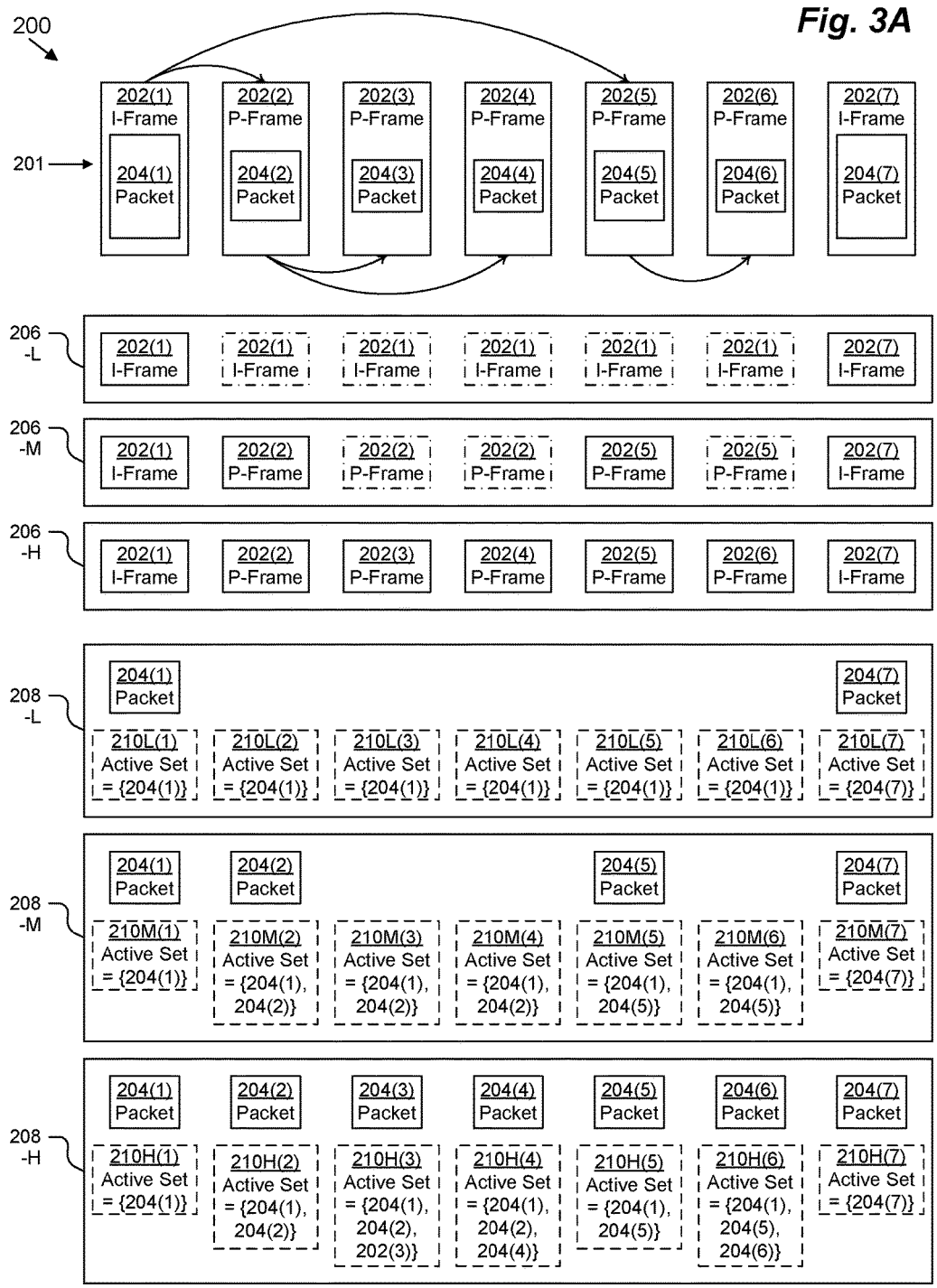

FIG. 3A shows an example arrangement 200 of layered video data 52, metadata 54, low-bitrate video stream 74-1, medium-bitrate video stream 74-2, and high-bitrate video stream 74-$n$ (see FIG. 1) in an embodiment in which the layered video data 52 is encoded using an inter-frame codec with 3 tiers of frame types.

As depicted, layered video stream 201 (which is realized by the layered video data 52 of FIG. 1) includes I-frames 202(1), 202(7) as well as P-frames 202(2), 202(3), 202(4), 202(5), 202(6). An I-frame 202(1), 202(7) is an "intra frame" or a key frame, which can be represented by a data packet 204(1), 204(7) that includes information that can be used to reconstruct the image of the I-frame 202(1), 202(7) without reference to any other frames 202 (this feature may be referred to as the I-frame being "encoded independently" of any other frames 202). I-frames 202(1), 202(7) may be uncompressed, or more commonly, they may be compressed using intra-frame compression, whereby redundancy within that very frame 202(1), 202(7) is exploited to reduce the size of the data packet 204(1), 204(7) of that frame as is well-known in the art. A data packet 204 is a collection of data that is part of layered video data 52. A data packet 204 may vary in size, depending on the frame 202 with which it is associated.

P-frames 202(2), 202(3), 202(4), 202(5), 202(6) are "predicted frames" or delta frames, which intervene between I-frames 202(1), 202(7). Each P-frame (e.g., 202(2)) may be reconstructed by combining a data packet (e.g., (204(1)) from one or more I-frames (e.g., 202(1)) with a data packet (e.g., 204(2) from that P-frame 202(2) itself, as is well-known in the art. Data packets 204 from P-frames contain difference or delta information that encode inter-frame information. For example, data packet 204(2) from P-frame 202(2) may include motion vectors indicating how blocks of pixels have moved since I-frame 202(1) as well as remainder data indicating divergences from the predicted motion, as is well-known in the art.

As depicted, there are two types of P-frames: primary P-frames 202(2), 202(5), which depend only on I-frames (e.g., 202(1)), and secondary P-frames 202(3), 202(4), 202(6) (which may also be referred to as nested P-frames), which also utilize data packets from other P-frames, as is well-known in the art. For example, secondary P-frame 204(3) may be predicted by combining motion vectors and remainder data from data packet 204(3) with a rendered version of primary P-frame 202(2), which itself is generated by combining motion vectors and remainder data from data packet 204(2) with a rendered version of I-frame 202(1), which itself is generated from data packet 204(1).

There may also be different types of frames, such as bidirectional frames (B-frames, not depicted), which are reconstructed using reference frames (either I-frames or P-frames) both before and after that B-frame (e.g., using implicit motion vectors based on the prior and subsequent reference frames). In some embodiments, some groups of pixels (e.g., macroblocks) in a P-frame or B-frame may be encoded using intra-frame compression rather than inter-frame compression (e.g., if an area or the screen, is very different than in the surrounding frames).

In some embodiments (not depicted), the entire video may be divided into a group of tiles (a tile being a group of pixels), each tile being treated as a separate video having its own I-frames and P-frames (and B-frames), the timing of the I-frames, P-frames, and B-frames being different from tile to tile. In some embodiments, one or more of the tiles may be encoded using a different video compression technique than the rest. For example, several tiles may be encoded using MPEG-2, while another tile is encoded using H.264. In another example, all tiles are encoded using H.264, but one tile is tuned to have short gaps between I-frames (e.g., one I-frame every 30 frames), while other tiles are tuned to have long gaps between I-frames (e.g., one I-frame every 300 frames).

Arrangement 200 also includes an example set of three video layers 206 (depicted as low-bitrate layer 206-L, medium-bitrate layer 206-M, and high-bitrate layer 206-H) into which layered video stream 201 may be divided. As depicted, high-bitrate layer 206-H includes all frames 202 from the original layered video stream 201.

An "epoch" (not depicted) is a structure defined by the set of all data packets 204 used to display a frame 202 at a given point of time in any layer (in a typical embodiment, all data packets 204 used by a highest layer 206-H). Each epoch typically corresponds to a particular frame 202 of the video stream 201. Thus, in FIG. 3A, there are seven epochs, one for each frame. The length of each epoch corresponds to a length of time that that the corresponding frame 202 is meant to be displayed. In the example case of a fixed framerate video, the length of an epoch is the period of time defined by an inverse of the frame rate of the highest layer 206-H, which, as in this case, is also the frame rate of the original layered video stream 201. Thus, for example, if the original layered video stream 201 has a framerate of 30 frames per second (fps), an epoch is approximately 0.0333 seconds. As depicted, at epoch number 1, high-bitrate layer 206-H displays I-frame 202(1). At epoch number 2, high-bitrate layer 206-H displays P-frame 202(2). At epoch number 3, high-bitrate layer 206-H displays P-frame 202(3). At epoch number 4, high-bitrate layer 206-H displays P-frame 202(4). At epoch number 5, high-bitrate layer 206-H displays P-frame 202(5). At epoch number 6, high-bitrate layer 206-H displays P-frame 202(6). At epoch number 7, high-bitrate layer 206-H displays I-frame 202(7).

Each epoch also contains a unique identifier, a timestamp, and a maximum delay. The maximum delay indicates how much of a delay is permitted between the creation timestamp of the frame 202 of that epoch and when that frame 202 may be displayed on a recipient device 60. In one example, the maximum delay may be 30 milliseconds.

Medium-bitrate layer 206-M includes I-frames 202(1), 202(7) as well as the primary P-frames 202(2), 202(5). At epochs in-between, the previous frame is repeated. Thus, as depicted, at epoch number 1, medium-bitrate layer 206-M displays I-frame 202(1). At epoch number 2, medium-bitrate layer 206-M displays primary P-frame 202(2). At epoch number 3, medium-bitrate layer 206-M repeats the display of primary P-frame 202(2) (the repetition being indicated by the dash-dot pattern). At epoch number 4, medium-bitrate layer 206-M again repeats the display of primary P-frame 202(2). At epoch number 5, medium-bitrate layer 206-M displays primary P-frame 202(5). At epoch number 6, medium-bitrate layer 206-M repeats the display of primary P-frame 202(5). At epoch number 7, medium-bitrate layer 206-M displays I-frame 202(7).

Low-bitrate layer 206-L includes only I-frames 202(1), 202(7). At epochs in-between I-frames 202(1) and 202(7), I-frame 202(1) is repeated. Thus, as depicted, at epoch number 1, low-bitrate layer 206-L displays I-frame 202(1). At epochs numbered 2 through 6 (inclusive), low-bitrate layer 206-L repeats the display of I-frame 202(1). At epoch number 7, low-bitrate layer 206-L displays I-frame 202(7).

Arrangement 200 also includes an example set of three video sub-streams 208 (depicted as low-bitrate video sub-stream 208-L, medium-bitrate video sub-stream 208-M, and high-bitrate video sub-stream 208-H) into which layered video stream 201 may be divided, together with associated metadata for each sub-stream 208.

As depicted, high-bitrate video sub-stream 208-H includes all packets 204 from the original layered video stream 201, each packet 204 being sent at a corresponding epoch (e.g., packet 204(1) at epoch 1, packet 204(2) at epoch 2, etc.). Each epoch X of the high-bitrate video sub-stream 208-H has associated metadata comprising an active set 210H(X) indicating which packets 204 are needed to render the video frame at that epoch. Thus, at epoch 1, since high-bitrate video layer 206-H displays I-frame 202(1), which has no dependencies, active set 210H(1) is the set {204(1)} since only packet 204(1) is needed to display I-frame 202(1). At epoch 2, since high-bitrate video layer 206-H displays primary P-frame 202(2), which depends only on I-frame 202(1), active set 210H(2) is the set {204(1), 204(2)} since packet 204(1) is needed to render I-frame 202(1) and packet 204(2) includes the difference data to render primary P-frame 202(2) given I-frame 202(1).

At epoch 3, since high-bitrate video layer 206-H displays secondary P-frame 202(3), which depends on both I-frame 202(1) and primary P-frame 2020(2), active set 210H(3) is the set {204(1), 204(2), 204(3)} since packets 204(1) and 204(2) are needed to render primary P-frame 202(2) and packet 204(3) includes the difference data to render secondary P-frame 202(3) given primary P-frame 202(2). Similarly, at epoch 4, since high-bitrate video layer 206-H displays secondary P-frame 202(4), which depends on both I-frame 202(1) and primary P-frame 2020(2), active set 210H(4) is the set {204(1), 204(2), 204(4)} since packets 204(1) and 204(2) are needed to render primary P-frame 202(2) and packet 204(4) includes the difference data to render secondary P-frame 202(4) given primary P-frame 202(2).

At epoch 5, since high-bitrate video layer 206-H displays primary P-frame 202(5), which depends only on I-frame 202(1), active set 210H(5) is the set {204(1), 204(5)} since packet 204(1) is needed to render I-frame 202(1) and packet 204(5) includes the difference data to render primary P-frame 202(5) given I-frame 202(1). At epoch 6, since high-bitrate video layer 206-H displays secondary P-frame 202(6), which depends on both I-frame 202(1) and primary P-frame 2020(5), active set 210H(6) is the set {204(1), 204(5), 204(6)} since packets 204(1) and 204(5) are needed to render primary P-frame 202(5) and packet 204(6) includes the difference data to render secondary P-frame 202(6) given primary P-frame 202(5). Finally, at epoch 7, since high-bitrate video layer 206-H displays I-frame 202(7), which has no dependencies, active set 210H(7) is the set {204(7)} since only packet 204(7) is needed to display I-frame 202(7).

As depicted, medium-bitrate video sub-stream 208-M includes only a subset of the packets 204 from the original layered video stream 201, each packet 204 being sent at a corresponding epoch (e.g., packet 204(1) at epoch 1, packet 204(2) at epoch 2, etc.). Each epoch X of the medium-bitrate video sub-stream 208-M has associated metadata comprising an active set 210M(X) indicating which packets 204 are needed to render the video frame at that epoch. Thus, at epoch 1, since medium-bitrate video layer 206-M displays I-frame 202(1), which has no dependencies, active set 210M(1) is the set {204(1)} since only packet 204(1) is needed to display I-frame 202(1). At epoch 2, since medium-bitrate video layer 206-M displays primary P-frame 202(2), which depends only on I-frame 202(1), active set 210M(2) is the set {204(1), 204(2)} since packet 204(1) is needed to render I-frame 202(1) and packet 204(2) includes the difference data to render primary P-frame 202(2) given I-frame 202(1).

However, at epoch 3, since medium-bitrate video layer 206-M repeats primary P-frame 202(2), the active set 210M (3) is again the set {204(1), 204(2)}, which means that no new data packet 204 is sent as part of medium-bitrate video sub-stream 208-M at epoch 3. Similarly, at epoch 4, since medium-bitrate video layer 206-M repeats primary P-frame 202(2), the active set 210M(4) is again the set {204(1), 204(2)}, which means that no new data packet 204 is sent as part of medium-bitrate video sub-stream 208-M at epoch 4.

At epoch 5, since medium-bitrate video layer 206-M displays primary P-frame 202(5), which depends only on I-frame 202(1), active set 210M(5) is the set {204(1), 204(5)} since packet 204(1) is needed to render I-frame 202(1) and packet 204(5) includes the difference data to render primary P-frame 202(5) given I-frame 202(1). Again, at epoch 6, since medium-bitrate video layer 206-M repeats primary P-frame 202(5), the active set 210M(6) is again the set {204(1), 204(5)}, which means that no new data packet 204 is sent as part of medium-bitrate video sub-stream 208-M at epoch 6. Finally, at epoch 7, since medium-bitrate video layer 206-M displays I-frame 202(7), which has no dependencies, active set 210M(7) is the set {204(7)} since only packet 204(7) is needed to display I-frame 202(7).

As depicted, low-bitrate video sub-stream 208-L also includes only a subset of the packets 204 from the original layered video stream 201, each packet 204 being sent at a corresponding epoch (e.g., packet 204(1) at epoch 1, packet 204(7) at epoch 7, etc.). Each epoch X of the low-bitrate video sub-stream 208-L has associated metadata comprising an active set 210L(X) indicating which packets 204 are needed to render the video frame at that epoch. Thus, at epoch 1, since low-bitrate video layer 206-L displays I-frame 202(1), which has no dependencies, active set 210L(1) is the set {204(1)} since only packet 204(1) is needed to display I-frame 202(1). However, at epochs 2 through 6 (inclusive), since low-bitrate video layer 206-L repeats I-frame 202(1), the active sets 210L(2), 210L(3), 210L(4), 210L(5), 210L(6) are all again the set {204(1)} which means that no new data packet 204 is sent as part of low-bitrate video sub-stream 208-L at any epoch from 2 through 6 (inclusive). Finally, at epoch 7, since low-bitrate video layer 206-L displays I-frame 202(7), which has no dependencies, active set 210L(7) is the set {204(7)} since only packet 204(7) is needed to display I-frame 202(7).

The epoch for a particular frame 202(X) includes the data packets 204 defined by the union of the active sets 210L(X), 210M(X), 210H(X) for that frame 202(X).

FIG. 3B shows another example arrangement 300 of layered video data 52, metadata 54, and video streams 74 (see FIG. 1) in an embodiment in which the layered video data 52 is encoded using an inter-frame codec with four tiers of frame types.

As depicted, layered video stream 301 (which is realized by the layered video data 52 of FIG. 1) includes I-frames 302(1), 302(3), 302(5) as well as P-frames 302(2), 302(4).

As depicted in FIG. 3B, there is only one type of P-frame, namely primary P-frames 302(2), 302(4), which depend only on I-frames (e.g., 302(1)).

As depicted, each I-frame 302(1), 302(3), 302(5) can be represented by a set of data packets 304, that include information that can be used to reconstruct the image of the I-frame 302(1), 302(3), 302(5) without reference to any other frames 302. I-frames 302(1), 302(3), 302(5) are compressed using progressively encoded intra-frame compression, as is well-known in the art. For example, I-frame 302(1) is encoded in two main passes (or scans). A first rough pass encodes I-frame 302(1) at a relatively low quality level, yielding the data of packet 304(1)a. A second pass encodes refinements to the first pass as the data of packet 304(1)b, so that when the data of packets 304(1)a and 304(1)b are combined, the I-frame 302(1) may be rendered at a higher level.

P-frames 302(2), 302(4) are delta frames, which intervene between I-frames 302(1), 302(3), 302(5). Each P-frame (e.g., 302(2)) may be reconstructed by combining data packets (e.g., (304(1)a, 304(1)b) from one or more I-frames (e.g., 302(1)) with a data packet (e.g., 304(2)) from that P-frame 302(2) itself, as is well-known in the art. Data packets 204 from P-frames contain difference or delta information that encode inter-frame information. For example, data packet 304(2) from P-frame 302(2) may include motion vectors indicating how blocks of pixels have moved since I-frame 302(1) as well as remainder data indicating divergences from the predicted motion, as is well-known in the art.

In addition, each frame 302 also includes optional overlay information (e.g., a cursor, timestamp, screen configuration information, etc.) which may be overlaid over the standard image of that frame 302. This overlay information is stored in packet 304(1)v for I-frame 302(1), in packet 304(2)v for P-frame 302(2), in packet 304(3)v for I-frame 302(3), in packet 304(3)v for P-frame 302(3), and in packet 304(5)v for I-frame 302(5).

Arrangement 300 also includes an example set of four video layers 306 (depicted as low-bitrate layer 306-L, medium-low-bitrate layer 306-M1, medium-high-bitrate layer 306-M2, and high-bitrate layer 306-H) into which layered video stream 301 may be divided. As depicted, low-bitrate layer 306-L includes only low quality versions 302(1)-LQ, 302(3)-LQ, 302(5)-LQ of I-frames 302(1), 302 (3), 302(5), respectively. At epochs in-between I-frames 302(1)-LQ, 302(3)-LQ, 302(5)-LQ, the respective I-frames are repeated. Medium-low-bitrate layer 306-M1 includes only high quality versions 302(1)-HQ, 302(3)-HQ, 302(5)-HQ of I-frames 302(1), 302(3), 302(5), respectively. At epochs in-between I-frames 302(1)-HQ, 302(3)-HQ, 302(5)-HQ, the respective I-frames are repeated. Medium-high-bitrate layer 306-M2 includes high quality versions 302(1)-HQ, 302(3)-HQ, 302(5)-HQ of I-frames 302(1), 302(3), 302(5), respectively, as well as all P-frames 302(2), 302(4). High-bitrate layer 306-H includes all frames 302 from the medium-high-bitrate layer 306-M2, but each frame also contains an overlay (e.g., a cursor, timestamp, brightness information, etc.). In some embodiments (not depicted), an overlay may also be used at layers other than the highest layer 306-H.

Arrangement 300 also includes an example set of four video sub-streams 308 (depicted as low-bitrate video sub-stream 308-L, medium-low-bitrate video sub-stream 308-M1, medium-high-bitrate video sub-stream 308-M2, and high-bitrate video sub-stream 308-H) into which layered video stream 301 may be divided, together with associated metadata for each sub-stream 308.

As depicted, high-bitrate video sub-stream 308-H includes all packets 304 from the original layered video stream 301, each packet 304 being sent at a corresponding epoch (e.g., packets 304(1)a, 304(1)b, 304(1)v at epoch 1, packets 304(2), 304(2)v at epoch 2, etc.). Each epoch X of the high-bitrate video sub-stream 308-H has associated metadata comprising an active set 310H(X) indicating which packets 304 are needed to render the video frame at that epoch. Thus, at epoch 1, since high-bitrate video layer 306-H displays I-frame 302(1), which has no dependencies, at high quality with an overlay, active set 310H(1) is the set {304(1)a, 304(1)b, 304(1)v}. At epoch 2, since high-bitrate video layer 306-H displays P-frame 302(2), which depends only on I-frame 302(1), with an overlay, active set 310H(2) is the set {304(1)a, 304(1)b, 304(2), 304(2)v} since packets 304(1)a, 304(1)b are needed to render I-frame 302(1), packet 304(2) includes the difference data to render P-frame 302(2) given I-frame 302(1), and packet 304(2)v includes the overlay information for P-frame 302(2). The data packets 304 and active sets 310H for epochs 3 through 5 are arranged analogously.

As depicted, medium-high bitrate video sub-stream 308-M2 includes only a subset of the packets 304 from the original layered video stream 301, each packet 304 being sent at a corresponding epoch (e.g., packets 304(1)a, 304(1)b at epoch 1, packet 304(2) at epoch 2, etc.). Each epoch X of the medium-high-bitrate video sub-stream 308-M2 has associated metadata comprising an active set 310M2(X) indicating which packets 304 are needed to render the video frame at that epoch. Thus, at epoch 1, since medium-high-bitrate video layer 306-M2 displays I-frame 302(1), which has no dependencies, at high quality, active set 310M2(1) is the set {304(1)a, 304(1)b} since only packets 304(1)a, 304(1)b are needed to display I-frame 302(1). At epoch 2, since medium-high-bitrate video layer 306-M2 displays P-frame 302(2), which depends only on I-frame 302(1), active set 310M2(2) is the set {304(1)a, 304(1)b, 304(2)} since packets 304(1)a, 304(1)b are needed to render I-frame 302(1) and packet 304(2) includes the difference data to render P-frame 302(2) given I-frame 302(1). The data packets 304 and active sets 310M2 for epochs 3 through 5 are arranged analogously.

As depicted, medium-low bitrate video sub-stream 308-M1 also includes only a subset of the packets 304 from the original layered video stream 301, each packet 304 being sent at a corresponding epoch (e.g., packets 304(1)a, 304(1)b at epoch 1, packets 304(3)a, 304(3)b at epoch 3, etc.). Each epoch X of the medium-low-bitrate video sub-stream 308-M1 has associated metadata comprising an active set 310M1(X) indicating which packets 304 are needed to render the video frame at that epoch. Thus, at epoch 1, since medium-low-bitrate video layer 306-M1 displays I-frame 302(1), which has no dependencies, at high quality, active set 310M1(1) is the set {304(1)a, 304(1)b} since only packets 304(1)a, 304(1)b are needed to display I-frame 302(1). At epoch 2, since medium-low-bitrate video layer 306-M1 repeats I-frame 302(1) at high quality, the active set 310M1(2) is again the set {304(1)a, 304(1)b} which means that no new data packet 304 is sent as part of medium-low-bitrate video sub-stream 308-M1 at epoch 2. The data packets 304 and active sets 310M1 for epochs 3 through 5 are arranged analogously.

As depicted, low-bitrate video sub-stream 308-L also includes only a subset of the packets 304 from the original layered video stream 301, each packet 304 being sent at a corresponding epoch (e.g., packet 304(1)a at epoch 1, packet 304(3)a at epoch 3, etc.). Each epoch X of the low-bitrate video sub-stream 308-L has associated metadata comprising an active set 310L(X) indicating which packets 304 are needed to render the video frame at that epoch. Thus, at epoch 1, since low-bitrate video layer 306-L displays I-frame 302(1), which has no dependencies, at low quality, active set 310L(1) is the set {304(1)a} since only packet 304(1)a is needed to display I-frame 302(1) at low quality. At epoch 2, since low-bitrate video layer 306-L repeats I-frame 302(1) at low quality, the active set 310L(2) is again the set {304(1)a} which means that no new data packet 304 is sent as part of low-bitrate video sub-stream 308-L at epoch 2. The data packets 304 and active sets 310L for epochs 3 through 5 are arranged analogously.

Operation of Source Computer

Figure 4:
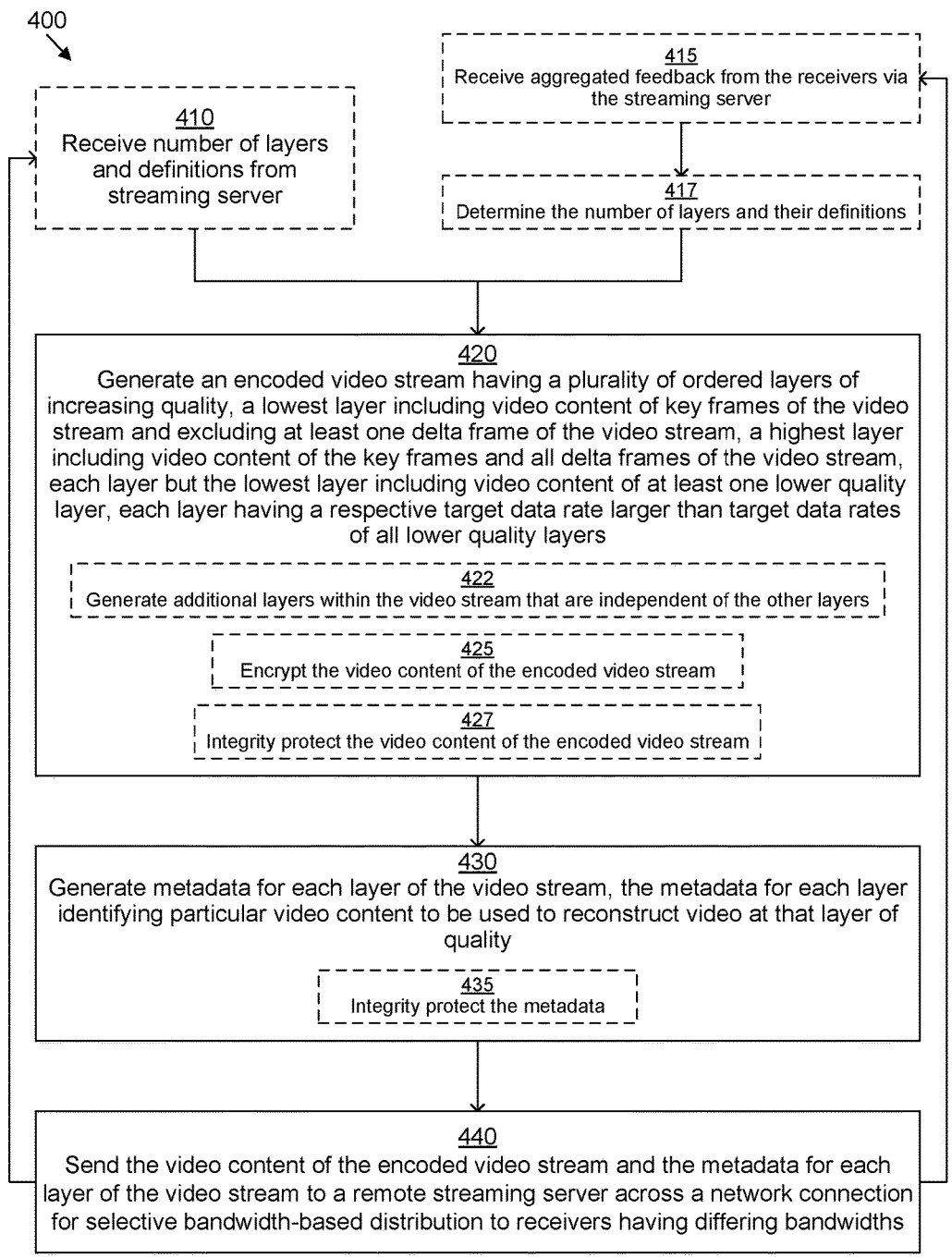
FIG. 4 is a flowchart depicting example methods according to various embodiments.

FIG. 4 depicts an example method 400 for a source computer 32 to generate an encoded video stream 52 having layered sub-streams 208, 308 with differing bitrates while allowing the streaming server 48 to intelligently distribute the appropriate sub-streams 208, 308 to recipient devices 60 based on their available bandwidth. The source computer 32 generates and sends metadata 54 along with the encoded stream 52 to allow the streaming server 48 to detect which data packets 204, 304 belong to each sub-stream 208, 308. The streaming server 48 is then able to selectively send consistent video sub-streams 74 at appropriate bitrates to each recipient device 60.

Method 400 is performed by sharing application 34 operating on a source computer 32. It should be understood that any time a piece of software (e.g., sharing application 34, streaming application 50, sharing application 62, video creation module 36, video encoding module 42, layer management module 44, video decoding module 64, bandwidth feedback module 66, operating system 111, etc.) is described as performing a method, process, step, or function, in actuality what is meant is that a computing device (e.g., computing device 100, source computer 32, streaming server 48, recipient device 60, etc.) on which that piece of software is running performs the method, process, step, or function when executing that piece of software on its processing circuitry 102. It should be understood that, in some embodiments, one or more of the steps or sub-steps may be omitted. Similarly, in some embodiments, one or more steps or sub-steps may be combined together or performed in a different order.

In optional step 410, which may not be performed in all embodiments, sharing application 34 receives a number of layers 206, 306 and defining information about those layers 204, 304 from the streaming application 50. For example, with reference to FIG. 2, sharing application 34 may receive a signal 56 from streaming application 50 indicating that there should be three layers 206-L, 206-M, 206-H and that layer 206-L should have a bitrate of 10 Mbps, layer 206-M should have a bitrate of 25 Mbps, and layer 206-H should have a bitrate of 50 Mbps. In some embodiments, the initial number and definitions of the layers 206, 306 is pre-programmed into the sharing application 34, so step 410 is not performed initially. In some embodiments, step 410 is performed in response to feedback 76 from the recipient devices 60 that causes streaming application 50 to determine that the number of levels 206, 306 and their definitions should change. In other embodiments, no such feedback 76 is used for that purpose, and step 410 is not performed in a feedback-oriented manner. Step 410 may be performed by the layer management module 44.

In some embodiments, instead of step 410, optional step 415 may be performed. In step 415, sharing application 34 receives feedback 76 from the recipient devices 60 as aggregated by the streaming server 48. The feedback 76 may include, for example, for each recipient device 60, maximum resolution, maximum bitrate, maximum framerate, available codecs, available processing rate (thereby defining the maximum complexity). etc. Following step 415 is step 417. In optional step 417, layer management module 44 determines a number of layers 206, 306 and defining information about those layers 204, 304 based on the aggregated feedback 76 received in step 415.

In step 420, video encoding module 42 generates an encoded video stream 52 having a plurality of ordered layers 206, 306 of increasing quality, a lowest layer 206-L, 306-L including video content (e.g., data packets 204, 304) of key frames (e.g., I-frames) of the video stream 52 and excluding at least one delta frame (e.g., a P-frame) of the video stream 52 (e.g., in the example of FIG. 3A, low-bitrate layer 206-L excludes P-frames 202(2) through 202(6)), a highest layer 206-H, 306-H including video content of the key frames and all delta frames of the video stream 52, each layer (e.g., in the context of FIG. 3A, layers 206-M, 206-H; in the context of FIG. 3B, layers 306-M1, 306-M2, 306-H) but the lowest layer 206-L, 306-L including video content of at least one lower quality layer 206, 306, each layer 206, 306 having a respective target data rate (e.g., the bitrate assigned in step 410) larger than target data rates of all lower quality layers. In some embodiments, video encoding module 42 uses an explicitly layered codec, while, in other embodiments, video encoding module 42 uses an implicitly layered codec.

In some embodiments, step 420 includes a sub-step 422 that involves generating additional layers (not depicted) within the video stream 52 that are independent of the other layers 206, 306. Thus, for example, in the context of FIG. 3A, there may be another layer added in having a target bitrate higher than layer 206-M but lower than 206-H but encoded by video encoding module 42 using a different codec than any of the other layers 206-L, 206-M, 206-H. This extra layer might not share data packets 204 with the other layers 206-L, 206-M, 206-H.

In some embodiments, step 420 includes a sub-step 425 that involves encrypting the data packets 204, 304 of the encoded video stream 52. This encryption may be done using end-to-end encryption between the video encoding module 42 on the source computer 32 and the video decoding modules 64 on the recipient devices 60. Thus, the streaming application 50 running on the streaming server 48 is not able to decrypt the data packets 204, 304; this allows for greater security.

In some embodiments, step 420 includes a sub-step 427 that involves integrity protecting the data packets 204, 304 of the encoded video stream 52. This integrity protection may be done by having the sharing application 34 generate a cryptographic signature (not depicted) of each data packet 204, 304 and send that signature to the streaming server 48 for forwarding to the recipient devices 60 for verification that the streaming server 48 has not modified any of the video packets 204, 304 and that no other intermediary has modified the data packets 204, 304 along the way. Video encoding module 42 may receive a raw videostream (not depicted) from the video creation module 36 as input for the encoding process. In some embodiments, this raw videostream may represent the changing views of the shared screen portion 37. In other embodiments, this raw videostream may represent the output of camera 40.

In step 430, layer management module 44 generates metadata 54 (e.g., active sets 210, 310) for each layer 206, 306 of the video stream 52, the metadata 54 for each layer 206, 306 identifying particular video content (e.g., data packets 204, 304) to be used to reconstruct video at that layer 206, 306 of quality. In some embodiments, steps 420 and 430 may be performed in parallel, so that as the data packets 204, 304 of each frame 202, 302 are created by the video encoding module 42, the active sets 210, 310 for each layer 206, 306 at that epoch (corresponding to each frame 202, 302 at the highest layer 206-H, 306-H) are also created by the layer management module 44.

In some embodiments, step 430 includes a sub-step 435 that involves integrity protecting the metadata 54 (e.g., the active sets 210, 310). This integrity protection may be done by having the sharing application 34 generate a cryptographic signature (not depicted) of each active set 210, 310 and send that signature to the streaming server 48 for forwarding to the recipient devices 60 for verification that the streaming server 48 has not modified any of the active sets 210, 310 and that no other intermediary has modified the active sets 210, 310 along the way. This is particularly useful in embodiments in which the metadata 54 is sent to one or more recipient devices 60.

Finally, in step 440, sharing application 34 sends the video content (e.g., the data packets 204, 304) of the encoded video stream 52 and the metadata 54 for each layer 206, 306 of the video stream 52 to streaming application 50 (typically running on remote streaming server 48 across network 46) for selective bandwidth-based distribution to recipient devices 60 having differing bandwidths (e.g., over their respective connections 72).

At this point, method 400 may repeat until sharing application 34 terminates the sharing of screen portion 37.

Operation of Streaming Server

Figure 5:
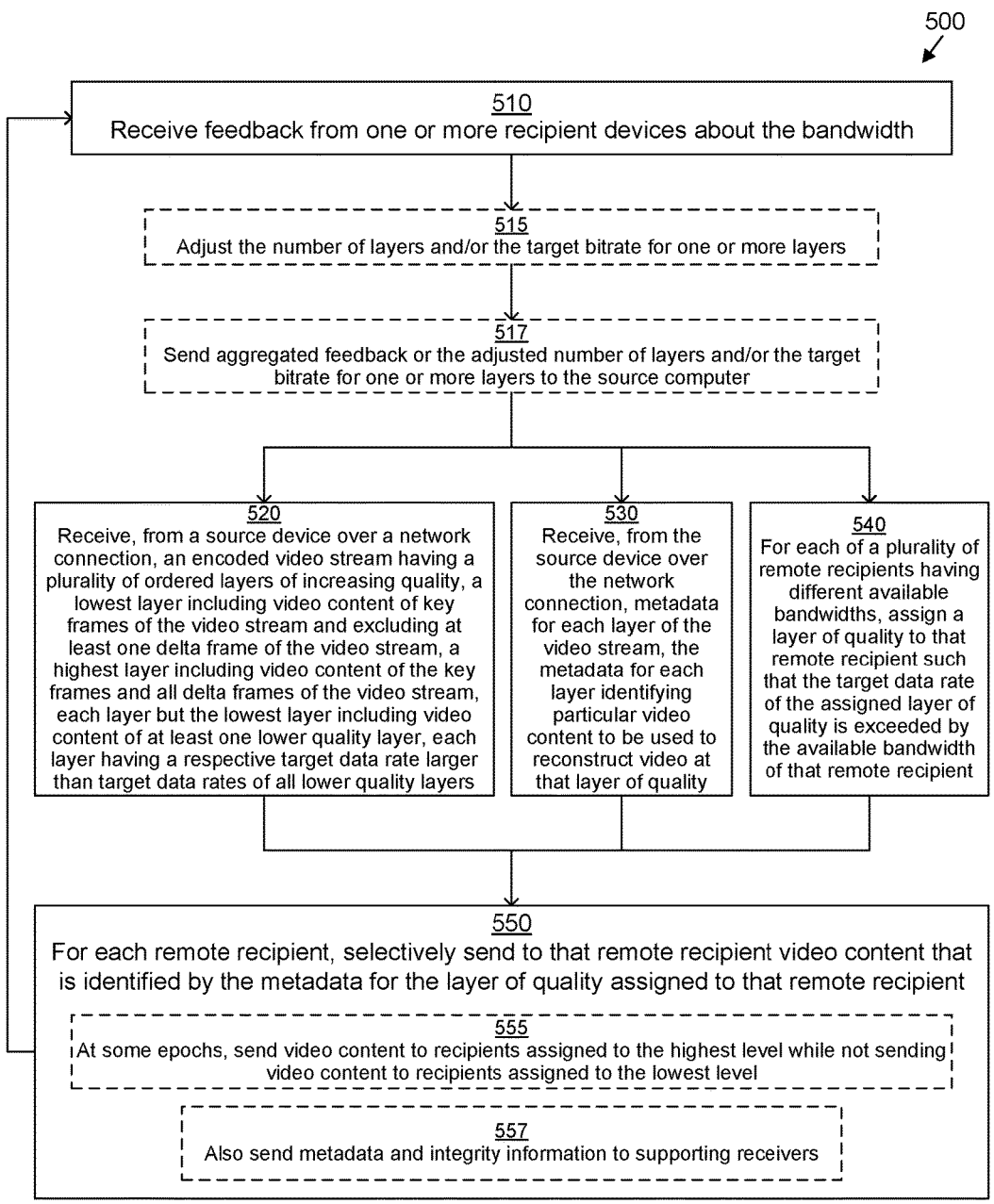
FIG. 5 is a flowchart depicting example methods according to various embodiments.

FIG. 5 depicts an example method 500 for a streaming server 48 to intelligently distribute appropriate layered substreams 208, 308 of an encoded video stream 52 with differing bitrates to recipient devices 60 based on their available bandwidth. Streaming server 48 receives metadata 54 along with the encoded stream 52, which it uses to detect which data packets 204, 304 belong to each sub-stream 208, 308. The streaming server 48 is then able to selectively send consistent video sub-streams 74 at appropriate bitrates to each recipient device 60.

Method 500 is performed by streaming application 50 operating on a streaming server 48. It should be understood that, in some embodiments, one or more of the steps or sub-steps may be omitted. Similarly, in some embodiments, one or more steps or sub-steps may be combined together or performed in a different order.

In step 510, streaming application 50 receives feedback 76 from one or more recipient device 60 concerning the bandwidth of its connection 72, and whether or not the bitrate of the video stream 74 that it is receiving is suitable (either too high or too low). In some embodiments, this feedback 76 may includes, for example, for each recipient device 60, maximum resolution, maximum bitrate, maximum framerate, available codecs, available processing rate (thereby defining the maximum complexity). etc. In other embodiments, all or some of the feedback 76 may be generated locally by use of a virtual buffer (not depicted) that models whether each recipient device 60 has received each data packet 204, 304 in time as is well-known in the art.

In optional step 515, which may not be performed in all embodiments, in response to step 510, streaming application 50 adjusts the number of layers 206, 306 and/or the target bitrate for the various layers 206, 306.

In optional step 517, which may not be performed in all embodiments, streaming application 50 then sends the adjusted number of layers 206, 306 and/or the target bitrate for the various layers 206, 306 to layer management module 44 of sharing application 34 (see step 410 of method 400 above). In other embodiments, when step 515 is omitted, in optional step 517, streaming application 50 aggregates the feedback 76 and sends the aggregated feedback 76 to layer management module 44 of sharing application 34 (see step 415 of method 400 above).

Subsequently, steps 520, 530, and 540 may be performed in parallel by streaming application 50. These steps 520, 530, 540 may be performed either at substantially the same time or they may be performed in sequence or in overlapping fashion.

In step 520, streaming application 50 receives, from video encoding module 42 of sharing application 34 (typically running on a remote source computer 32 across network 46, although, in some embodiments, sharing application 34 may run on the same computing device 100 as the streaming application 48), an encoded video stream 52 having a plurality of ordered layers 206, 306 of increasing quality, a lowest layer 206-L, 306-L including video content (e.g., data packets 204, 304) of key frames (e.g., I-frames) of the video stream 52 and excluding at least one delta frame (e.g., a P-frame) of the video stream 52 (e.g., in the example of FIG. 3A, low-bitrate layer 206-L excludes P-frames 202(2) through 202(6)), a highest layer 206-H, 306-H including video content of the key frames and all delta frames of the video stream 52, each layer (e.g., in the context of FIG. 3A, layers 206-M, 206-H; in the context of FIG. 3B, layers 306-M1, 306-M2, 306-H) but the lowest layer 206-L, 306-L including video content of at least one lower quality layer 206, 306, each layer 206, 306 having a respective target data rate (e.g., the bitrate assigned in step 515) larger than target data rates of all lower quality layers. In some embodiments, the received encoded video stream 52 is encrypted, such that the streaming application 50 is not able to decipher the video.

In step 530, streaming application 50 receives, from layer management module 44 of sharing application 34, metadata 54 (e.g., active sets 210, 310) for each layer 206, 306 of the video stream 52, the metadata 54 for each layer 206, 306 identifying particular video content (e.g., data packets 204, 304) to be used to reconstruct video at that layer 206, 306 of quality.

In step 540, for each recipient device 60, each having a connection 72 with a respective bandwidth, streaming application 50 assigns a layer 206, 306 of quality to that recipient device 60 such that the target data rate of the assigned layer 206, 306 of quality is exceeded by the available bandwidth of the connection 72 for that recipient device 60. For example, say connection 72-1 of recipient device 60-1 has a bandwidth of 12 Mbps, connection 72-2 of recipient device 60-2 has a bandwidth of 27 Mbps, and connection 72-n of recipient device 60-n has a bandwidth of 57 Mbps, and the available layers 306-L, 306-M1, 306-M2, 306-H have been assigned respective target bitrates of 10 Mpbs, 20 Mbps, 35 Mbps, and 50 Mbps. In that situation, streaming application 50 would assign layer 306-L to recipient device 60-1, layer 306-M1 to recipient device 60-2, and layer 306-H to recipient device 60-n. It should be understood that in embodiments (see above at step 422) in which additional independent layers are included in the video stream 52, streaming application 50 may assign one of these additional independent layers to any given recipient device 60.

Finally, in step 550, streaming application 50 selectively sends to each recipient device 60 the video content (e.g., the data packets 204, 304) of the layer 206, 306 assigned to that respective recipient device 60 as identified by the received metadata 54. In some arrangements (sub-step 555), for some epochs, this includes sending data packets 204, 304 to a recipient device 60 at the highest level 206-H, 306-H while refraining from sending any data packets 204, 304 to another recipient device 60 at the lowest level 206-L, 306-L. It should be understood that in embodiments (see above at step 422) in which additional independent layers are included in the video stream 52, if streaming application 50 has assigned one of these additional independent layers to any given recipient device 60 (see above at step 540), then, in step 550, sends the independent data packets from the assigned additional independent layer to that recipient device 60.

In some embodiments (not depicted), if the bitrate of even the lowest layer 206-L, 306-L is higher than the available bandwidth of the connection 72 for a particular recipient device 60, then streaming application 50 may skip certain "skippable" epochs. Thus, for example, in the context of FIG. 3B, layer 306-L may be deemed skippable if it contains frames 302 that may be skipped due to having independent coding from other frames 302. Since each frame 302(1)-LQ, 302(3)-LQ, 302(5)-LQ, of layer 306-L is an I-frame, streaming application 50 may skip sending any of these frames 302(1)-LQ, 302(3)-LQ, 302(5)-LQ to the particular recipient device 60 in order to lower the bandwidth even further. It should be noted that even if some of the frames 202, 302 at the lowest layer are P-frames, certain combinations of those frames 202, 302 may be deemed skippable in combination.

In some embodiments, in optional step 557, streaming application 50 sends the received metadata 54 and its associated integrity information to recipient devices 60 that support receiving such information.

In the example of FIG. 3A, if recipient device 60-1 is at level 206-L, recipient device 60-2 is at level 206-M, and recipient device 60-n is at level 206-H, streaming application 50 selectively sends data packets 304 as follows. At epoch 1, the active set 210L(1), 210M(1), 210H(1) for each layer 206-L, 206-M, 206-H indicates packet 204(1), so streaming application 50 sends packet 204(1) to each recipient device 60-1, 60-2, 60-n.

At epoch 2, the active set 210M(2), 210H(2) for layers 206-M, 206-H indicates packets 204(1) and 204(2), but 204(1) has already been sent, so streaming application 50 sends packet 204(2) to recipient devices 60-2, 60-n. However, the active set 210L(2) only indicates packet 204(1), which has already been sent, so, at epoch 2, streaming application 50 does not send any packet 204 to recipient device 60-1.

At epoch 3, the active set 210H(3) for layer 206-H indicates packets 204(1), 204(2), and 204(3), but 204(1) and 204(2) have already been sent, so streaming application 50 sends packet 204(3) to recipient device 60-n. However, the active set 210M(3) only indicates packets 204(1), 204(2) which have already been sent, so, at epoch 3, streaming application 50 does not send any packet 204 to recipient device 60-2. Similarly, the active set 210L(3) only indicates packet 204(1), which has already been sent, so, at epoch 3, streaming application 50 does not send any packet 204 to recipient device 60-1.

At epoch 4, the active set 210H(4) for layer 206-H indicates packets 204(1), 204(2), and 204(4), but 204(1) and 204(2) have already been sent, so streaming application 50 sends packet 204(4) to recipient device 60-*n*. However, the active set 210M(4) only indicates packets 204(1), 204(2) which have already been sent, so, at epoch 4, streaming application 50 does not send any packet 204 to recipient device 60-2. Similarly, the active set 210L(4) only indicates packet 204(1), which has already been sent, so, at epoch 4, streaming application 50 does not send any packet 204 to recipient device 60-1.

At epoch 5, the active set 210M(5), 210H(5) for layers 206-M, 206-H indicates packets 204(1) and 204(5), but 204(1) has already been sent, so streaming application 50 sends packet 204(5) to recipient devices 60-2, 60-*n*. However, the active set 210L(5) only indicates packet 204(1), which has already been sent, so, at epoch 5, streaming application 50 does not send any packet 204 to recipient device 60-1.

At epoch 6, the active set 210H(6) for layer 206-H indicates packets 204(1), 204(5), and 204(6), but 204(1) and 204(5) have already been sent, so streaming application 50 sends packet 204(6) to recipient device 60-*n*. However, the active set 210M(6) only indicates packets 204(1), 204(5) which have already been sent, so, at epoch 6, streaming application 50 does not send any packet 204 to recipient device 60-2. Similarly, the active set 210L(6) only indicates packet 204(1), which has already been sent, so, at epoch 6, streaming application 50 does not send any packet 204 to recipient device 60-1.

At epoch 7, the active set 210L(7), 210M(7), 210H(7) for each layer 206-L, 206-M, 206-H indicates packet 204(7), so streaming application 50 sends packet 204(7) to each recipient device 60-1, 60-2, 60-*n*.

In some embodiments, if after operation of step 540, a recipient device 60 is upgraded from a lower level 206, 306 to a higher level 206, 306, then, in step 550 it may be necessary to send an old data packet 204, 304 to that recipient device 60 at a later epoch. For example, looking at the example of FIG. 3A, recipient device 60-1 initially is at lowest level 206-L, but then, just before epoch 4, recipient device 60-1 is upgraded to highest level 206-H. At that point recipient device 60-1 has received only packet 204(1). However, the active set 210H(4) is {204(1), 204(2), 204(4)}. Thus, in addition to sending packet 204(4) at epoch 4, streaming application 50 also sends packet 204(2) to recipient device 60-1 at epoch 4 because otherwise, recipient device 60-1 would not be able to properly display frame 202(4).

At this point, method 500 may repeat until sharing application 34 terminates the sharing of screen portion 37.

Operation of Recipient Devices

The various recipient devices 60 operate their respective sharing applications 62 to receive and display shared screen portion 70 on their respective displays 68. Video decoding module 64 receives the data packets 204, 304 of the assigned layer 206, 306 for that recipient device 60 and decodes the data packets to reconstruct the video of that assigned layer 206, 306. In some embodiments, recipient devices 60 also decrypt the data packets 204, 304 prior to decoding the video. It should be noted that the various recipient devices 60 may not be aware of which layer 206, 306 they are assigned to. However, in some embodiments, some of the recipient devices 60 may be aware of the layer 206, 306 that they are assigned to, and they may make use of metadata 54 forwarded from the streaming server 50 (see above at sub-step 557).

Bandwidth feedback module 66 of sharing application 62 functions to provide feedback 76 to streaming application 50, indicating whether the received video stream 74 is too fast or slow for the bandwidth of the connection 72.

Conclusion

Thus, improved techniques have been provided to allow a source computer 32 to generate an encoded video stream 52 having layered sub-streams 208, 308 with differing bitrates while allowing the streaming server 48 to intelligently distribute the appropriate sub-streams 208, 308 to recipient devices 60 based on their available bandwidth. This may be accomplished by having the source computer 32 generate and send metadata 52 along with the encoded stream 54 to allow the streaming server 50 to detect which data packets 204, 304 belong to each sub-stream 208, 308. The streaming server 48 is then able to selectively send consistent video sub-streams 74 at appropriate bitrates to each recipient device 60.

While various embodiments of the present disclosure have been particularly shown and described, it will be understood by those skilled in the art that various changes in form and details may be made therein without departing from the spirit and scope of the present disclosure as defined by the appended claims.

For example, it should be understood that although various embodiments have been described as being methods, software embodying these methods is also included. Thus, one embodiment includes a tangible computer-readable medium (such as, for example, a hard disk, a floppy disk, an optical disk, computer memory, flash memory, etc.) programmed with instructions, which, when performed by a computer or a set of computers, cause one or more of the methods described in various embodiments to be performed. Another embodiment includes a computer which is programmed to perform one or more of the methods described in various embodiments.

Finally, it should be understood that all embodiments which have been described may be combined in all possible combinations with each other, except to the extent that such combinations have been explicitly excluded.

What is claimed is:

1. A method performed by a computing device, the method comprising:

generating an encoded video stream having a plurality of ordered layers of increasing quality, a lowest layer including video content of key frames of the video stream and excluding at least one delta frame of the video stream, a highest layer including video content of the key frames and all delta frames of the video stream, each layer of quality but the lowest layer including video content of at least one lower quality layer, each layer of quality having a respective target data rate larger than target data rates of all lower quality layers, wherein:

each delta frame includes difference data which, in combination with video content of at least one previous frame of the video stream, reconstructs that delta frame, and each key frame contains a complete picture encoded independently of other frames;
generating metadata for each layer of the video stream, the metadata for each layer identifying particular video content to be used to reconstruct video at that layer of quality; and
sending the video content of the encoded video stream and the metadata for each layer of the video stream to a streaming server for selective bandwidth-based distribution to receivers having differing network bandwidths.

2. The method of claim 1 wherein:
the streaming server is remote from the computing device; and
sending the video content of the encoded video stream and the metadata for each layer of the video stream to the streaming server includes sending the video content and the metadata to the streaming server across a network connection.

3. The method of claim 1 wherein generating the encoded video stream includes taking, as input, a screen of a display of the computing device, the screen being controlled by a user of the computing device, the user sharing the screen with the receivers.

4. The method of claim 1 wherein:
an epoch is defined by a period of time during which each frame of the highest layer is displayed; and
generating metadata for each layer of the video stream includes, for each epoch of the video stream, generating an active set for each layer, wherein the active set for each given layer and each given epoch includes a reference to:
video content of a key frame upon which a display of that given epoch is based; and
video content of all delta frames which are needed to generate a display of that given epoch at that given layer of quality in combination with the video content of the key frame upon which that given epoch is based.

5. The method of claim 1 wherein generating the encoded video stream includes compressing video using an inter-frame compression scheme in a scalable manner, the receivers being configured to decode the video encoded in the inter-frame compression scheme.

6. The method of claim 5 wherein the streaming server is not configured to decode the video encoded in the inter-frame compression scheme.

7. The method of claim 5 wherein the method further comprises:
generating additional encoded video streams each having a plurality of ordered layers of increasing quality, the encoded video stream and the additional encoded video streams piecing together to form a larger video stream, the larger video stream representing a screen of a display of the computing device, at least one of the additional encoded video streams being compressed using a scheme different than the inter-frame compression scheme used for the encoded video stream;
generating additional metadata for each layer of the additional encoded video streams; and
sending video content of the additional encoded video streams and the additional metadata for each layer of the additional encoded video streams to the streaming server for selective bandwidth-based distribution to the receivers.

8. The method of claim 5 wherein:
the lowest layer includes all video content of key frames to the exclusion of video content of any delta frames of the video stream; and
an intermediate layer includes video content of key frames and a strict subset of delta frames of the video stream.

9. The method of claim 5 wherein:
the lowest layer includes a strict subset of the video content of key frames of the video stream, to the exclusion of video content of any delta frames of the video stream, the strict subset of the video content of the key frames generating the key frames at a low level of quality; and
an intermediate layer includes all video content of the key frames, wherein all video content of the key frames generates the key frames at a higher level of quality than the low level of quality.

10. The method of claim 5 wherein:
an intermediate layer includes video content of the key frames and all delta frames of the video stream, excluding any overlays; and
the highest layer includes video content of the key frames and all delta frames of the video stream as well as overlay information to be overlaid over the key frames and all delta frames.

11. The method of claim 5 wherein the method further comprises:
generating an additional layer of the encoded video stream, the additional layer including video content of the video stream encoded independent of video content of the ordered layers, the additional layer being encoded using a scheme different than the inter-frame compression scheme, the additional layer not including video content of the ordered layers;
generating additional metadata for the additional layer; and
sending the additional metadata to the streaming server together with the video content of the encoded video stream and the metadata for each ordered layer of the video stream.

12. The method of claim 1 wherein the method further includes receiving definition information regarding the ordered layers of quality from the streaming server, the definition information including:
a number of layers to be used in the encoded video stream; and
the target data rate of each layer of quality.

13. The method of claim 12 wherein the method further includes receiving updated definition information regarding the ordered layers of quality from the streaming server based on feedback provided to the streaming server by the receivers during operation.

14. The method of claim 1 wherein the method further includes:
receiving, from the streaming server, aggregated feedback from each of the receivers; and
in response to receiving the aggregated feedback, updating:
a number of layers to be used in the encoded video stream; and
the target data rate of each layer of quality.

15. The method of claim 1 wherein the method further comprises encrypting the video content of the encoded video stream prior to sending the video content of the encoded video stream to the streaming server, the receivers being configured to decrypt the encrypted video content, the streaming server not being configured to decrypt the encrypted video content.

16. The method of claim 1 wherein the method further comprises:
generating a cryptographic signature of the video content of the encoded video stream using a key;
sending the generated cryptographic signature to the streaming server, the receivers being configured to confirm integrity of the video content with reference to the generated cryptographic signature, the streaming server not having the key.

17. A method performed by a streaming server device, the method comprising:
receiving, from a source device over a network connection, an encoded video stream having a plurality of ordered layers of increasing quality, a lowest layer including video content of key frames of the video stream and excluding at least one delta frame of the video stream, a highest layer including video content of the key frames and all delta frames of the video stream, each layer of quality but the lowest layer including video content of at least one lower quality layer, each layer of quality having a respective target data rate larger than target data rates of all lower quality layers, wherein:
each delta frame includes difference data which, in combination with video content of at least one previous frame of the video stream, reconstructs that delta frame, and
each key frame contains a complete picture encoded independently of other frames;
receiving, from the source device over the network connection, metadata for each layer of the video stream, the metadata for each layer identifying particular video content to be used to reconstruct video at that layer of quality;
for each of a plurality of remote recipients having different available bandwidths, assigning a layer of quality to that remote recipient such that the target data rate of the assigned layer of quality is exceeded by the available bandwidth of that remote recipient; and
for each remote recipient, selectively sending to that remote recipient video content that is identified by the metadata for the layer of quality assigned to that remote recipient.

18. The method of claim 17 wherein:
an epoch is defined by a period of time during which each frame of the highest layer is displayed; and
receiving metadata for each layer of the video stream includes, for each epoch of the video stream, receiving an active set for each layer, wherein the active set for each given layer and each given epoch includes a reference to:
video content of a key frame upon which a display of that given epoch is based; and
video content of all delta frames which are needed to generate a display of that given epoch at that given layer of quality in combination with the video content of the key frame upon which that given epoch is based.

19. The method of claim 18 wherein, for each remote recipient, selectively sending to that remote recipient video content that is identified by the metadata for the layer of quality assigned to that remote recipient includes, for a particular epoch at which the highest layer includes video content of a delta frame:
sending, at the particular epoch, video content to a first recipient device that is assigned the highest layer of quality; and
refraining from sending, at the particular epoch, any video content to a second recipient device that is assigned the lowest layer of quality.

20. The method of claim 17 wherein the streaming server device is not configured to decode the received video stream.

21. The method of claim 17 wherein receiving the encoded video stream includes receiving the video content in encrypted form, the streaming server device not being configured to decrypt the video content, the remote recipients being configured to decrypt the video content.

22. The method of claim 17,
wherein the method further includes receiving feedback from the remote recipients, the feedback from each remote recipient indicating whether the video content sent to that remote recipient is:
too fast for the available bandwidth of that remote recipient,
too slow for the available bandwidth of that remote recipient, or
suitable for the available bandwidth of that remote recipient; and
wherein, for each remote recipient, assigning the layer of quality to that remote recipient includes:
for a remote recipient from which the feedback indicates that the video content sent to that remote recipient is too fast, reassigning a lower layer of quality to that remote recipient;
for a remote recipient from which the feedback indicates that the video content sent to that remote recipient is too slow, reassigning a higher layer of quality to that remote recipient; and
for a remote recipient from which the feedback indicates that the video content sent to that remote recipient is suitable, leaving the layer of quality assigned to that remote recipient unchanged.

23. The method of claim 22 wherein, for each remote recipient, selectively sending to that remote recipient video content that is identified by the metadata for the layer of quality assigned to that remote recipient includes, for a particular epoch at which the highest layer includes video content of a first delta frame and at which a lower layer does not include video content of the first delta frame:
sending, at the particular epoch, video content of only the first delta frame to a first recipient device that is assigned the highest layer of quality; and
sending, at the particular epoch, video content of both the first delta frame and a second delta frame, the second delta frame being from an earlier epoch, to a second recipient device which was reassigned to a higher layer of quality.

24. The method of claim 22 wherein the method further comprises, in response to receiving the feedback:
determining that a new set of target data rates different than the target data rates for each layer of quality would be more efficient for the remote recipients in light of the feedback; and
sending the new set of target data rates to the source device over the network connection for use in encoding the video stream in the future.

25. The method of claim 22 wherein the method further comprises, in response to receiving the feedback, sending the feedback from the remote recipients to the source device in an aggregated manner.

26. The method of claim 17 wherein the method further comprises:
- using a virtual buffer for each remote recipient to model its video reception; and
- selectively reassigning the remote recipients to new layers of quality based on underrun and overrun conditions in their respective virtual buffers.

27. A computer program product comprising a non-transitory computer-readable storage medium storing a set of instructions, which when executed by a computing device, cause the computing device to perform the following operations:
- generating an encoded video stream having a plurality of ordered layers of increasing quality, a lowest layer including video content of key frames of the video stream and excluding at least one delta frame of the video stream, a highest layer including video content of the key frames and all delta frames of the video stream, each layer of quality but the lowest layer including video content of at least one lower quality layer, each layer of quality having a respective target data rate larger than target data rates of all lower quality layers, wherein:
  - each delta frame includes difference data which, in combination with video content of at least one previous frame of the video stream, reconstructs that delta frame, and
  - each key frame contains a complete picture encoded independently of other frames;
- generating metadata for each layer of the video stream, the metadata for each layer identifying particular video content to be used to reconstruct video at that layer of quality; and
- sending the video content of the encoded video stream and the metadata for each layer of the video stream to a streaming server for selective bandwidth-based distribution to receivers having differing network bandwidths.

28. A computer program product comprising a non-transitory computer-readable storage medium storing a set of instructions, which when executed by a computing device, cause the computing device to perform the following operations:
- receiving, from a source device over a network connection, an encoded video stream having a plurality of ordered layers of increasing quality, a lowest layer including video content of key frames of the video stream and excluding at least one delta frame of the video stream, a highest layer including video content of the key frames and all delta frames of the video stream, each layer of quality but the lowest layer including video content of at least one lower quality layer, each layer of quality having a respective target data rate larger than target data rates of all lower quality layers, wherein:
  - each delta frame includes difference data which, in combination with video content of at least one previous frame of the video stream, reconstructs that delta frame, and
  - each key frame contains a complete picture encoded independently of other frames;
- receiving, from the source device over the network connection, metadata for each layer of the video stream, the metadata for each layer identifying particular video content to be used to reconstruct video at that layer of quality;
- for each of a plurality of remote recipients having different available bandwidths, assigning a layer of quality to that remote recipient such that the target data rate of the assigned layer of quality is exceeded by the available bandwidth of that remote recipient; and
- for each remote recipient, selectively sending to that remote recipient video content that is identified by the metadata for the layer of quality assigned to that remote recipient.

\* \* \* \* \*